United States Patent
Srivastava et al.

(10) Patent No.: US 10,084,698 B2
(45) Date of Patent: Sep. 25, 2018

(54) SELECTIVELY ENABLING FIRST AND SECOND COMMUNICATION PATHS USING A REPEATER

(71) Applicant: Intel Corporation, Santa Clara, CA (US)

(72) Inventors: Amit Kumar Srivastava, Penang (MY); Teong Guan Yew, Perak (MY)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 14/670,213

(22) Filed: Mar. 26, 2015

(65) Prior Publication Data

US 2016/0285757 A1 Sep. 29, 2016

(51) Int. Cl.
*H04L 12/721* (2013.01)
*H04L 12/10* (2006.01)
*H04L 12/933* (2013.01)

(52) U.S. Cl.
CPC ............ *H04L 45/566* (2013.01); *H04L 12/10* (2013.01); *H04L 49/109* (2013.01)

(58) Field of Classification Search
CPC .............................. H04L 45/566; H04L 12/10
See application file for complete search history.

(56) References Cited

U.S. PATENT DOCUMENTS

| | | | | |
|---|---|---|---|---|
| 7,805,559 B1* | 9/2010 | Stumpf | ............... | G06F 13/4045 710/313 |
| 7,859,856 B2* | 12/2010 | Lanning | ............... | H04L 12/2602 361/728 |
| 2007/0297600 A1 | 12/2007 | Narayanan et al. | | |
| 2010/0109749 A1* | 5/2010 | Chen | ..................... | G06F 13/385 327/419 |
| 2011/0165792 A1* | 7/2011 | Burns | ................... | H01R 13/465 439/488 |
| 2012/0293113 A1 | 11/2012 | Fischer et al. | | |
| 2014/0210535 A1* | 7/2014 | Bartling | ................ | G11C 11/419 327/199 |
| 2014/0372659 A1 | 12/2014 | Solomon et al. | | |
| 2015/0370299 A1* | 12/2015 | Waters | ...................... | G06F 1/26 713/310 |
| 2016/0191313 A1* | 6/2016 | Chen | ................... | H04L 41/0816 370/315 |

FOREIGN PATENT DOCUMENTS

| WO | WO2014/072826 | 12/2007 |
|---|---|---|
| WO | 2016153674 A1 | 9/2016 |

OTHER PUBLICATIONS

International Search Report and Written Opinion in International Application No. PCT/US2016/019015 dated Jun. 2, 2016.

* cited by examiner

*Primary Examiner* — Yemane Mesfin
*Assistant Examiner* — Henry Baron
(74) *Attorney, Agent, or Firm* — Alliance IP, LLC

(57) ABSTRACT

A port of a first integrated circuit is coupled to a first communication path. Configuration information is communicated between a connector coupled to a second device and a second integrated circuit through the port and the first communication path. The port is decoupled from the first communication path. The port is coupled to a second communication path. Data is communicated between the connector and the second integrated circuit through the port and the second communication path.

20 Claims, 6 Drawing Sheets

US 10,084,698 B2

SELECTIVELY ENABLING FIRST AND SECOND COMMUNICATION PATHS USING A REPEATER

FIELD

The present disclosure relates in general to the field of computer development, and more specifically, to selectively enabling first and second communication paths using a repeater.

BACKGROUND

A cable that carries data and other signals (such as power) between devices may enable multiple communication paths through the cable. One or more wires or other transmission media of the cable may be used to send information using one communication path while one or more other wires of the cable may be used to send information using a separate communication path. For example, a cable may include a wire pair to transfer data at a high speed and one or more other wires to transfer sideband data such as configuration data.

BRIEF DESCRIPTION OF THE DRAWINGS

Like reference numbers and designations in the various drawings indicate like elements.

DETAILED DESCRIPTION

Figure 1:
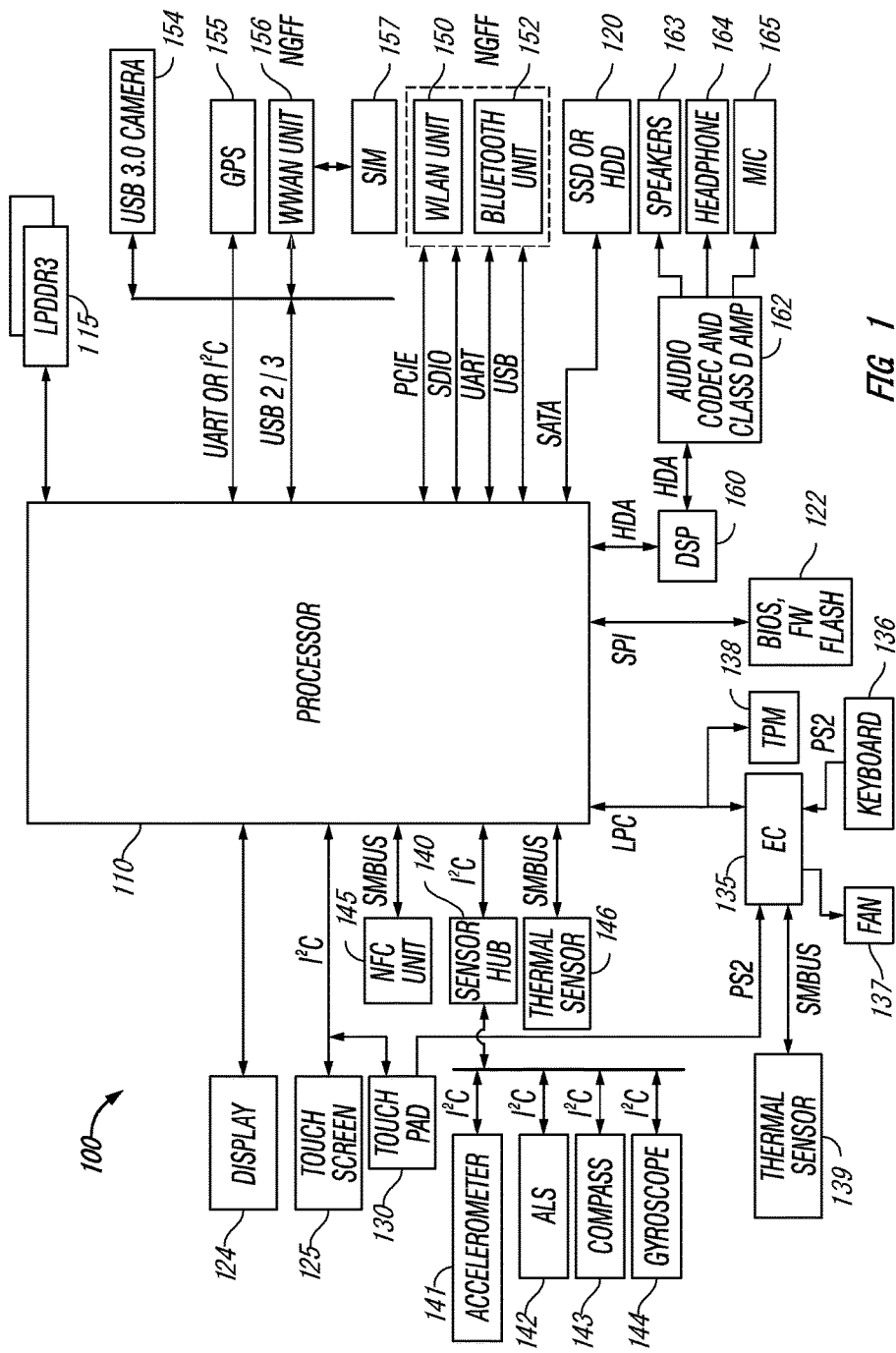
FIG. 1 illustrates a block diagram of components present in a computer system in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring now to FIG. 1, a block diagram of components present in a computer system in accordance with certain embodiments. As shown in FIG. 1, system 100 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 1 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 1, a processor 110, in one embodiment, includes a microprocessor, multi-core processor, multi-threaded processor, an ultra low voltage processor, an embedded processor, or other known processing element. In the illustrated implementation, processor 110 acts as a main processing unit and central hub for communication with many of the various components of the system 100. As one example, processor 100 is implemented as a system on a chip (SoC). As a specific illustrative example, processor 110 includes an Intel® Architecture Core™-based processor such as an i3, i5, i7 or another such processor available from Intel Corporation, Santa Clara, Calif. However, other low power processors such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 110 in one implementation will be discussed further below to provide an illustrative example.

Processor 110, in one embodiment, communicates with a system memory 115. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 120 may also couple to processor 110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 1, a flash device 122 may be coupled to processor 110, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 100. Specifically shown in the embodiment of FIG. 1 is a display 124 which may be a high definition LCD or LED panel configured within a lid portion of the chassis. This display panel may also provide for a touch screen 125, e.g., adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect that can be implemented as a high performance graphics interconnect. Touch screen 125 may be coupled to processor 110 via another interconnect, which in an embodiment can be an I2C interconnect. As further shown in FIG. 1, in addition to touch screen 125, user input by way of touch can also occur via a touch pad 130 which may be configured within the chassis and may also be coupled to the same I2C interconnect as touch screen 125.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 110 in different manners. Certain inertial and environmental sensors may couple to processor 110 through a sensor hub 140, e.g., via an I2C interconnect. In the embodiment shown in FIG. 1, these sensors may include an accelerometer 141, an ambient light sensor (ALS) 142, a compass 143 and a gyroscope 144. Other environmental sensors may include one or more thermal sensors 146 which in some embodiments couple to processor 110 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 1, various peripheral devices may couple to processor 110 via a low pin count (LPC) interconnect. In the embodiment shown, various components can be coupled through an embedded controller 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003, may also couple to processor 110 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 100 can communicate with external devices in a variety of manners, including wirelessly. In the embodiment shown in FIG. 1, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 145, devices in close proximity to each other can communicate. For example, a user can enable system 100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 1, additional wireless units can include other short range wireless engines including a WLAN unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receiver transmitter (UART) link. Or these units may couple to processor 110 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 156 which in turn may couple to a subscriber identity module (SIM) 157. In addition, to enable receipt and use of location information, a GPS module 155 may also be present. Note that in the embodiment shown in FIG. 1, WWAN unit 156 and an integrated capture device such as a camera module 154 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones (such as a digital microphone array) to provide for high quality audio inputs to enable voice-activated control of various operations within the system. Note also that audio outputs can be provided from amplifier/CODEC 162 to a headphone jack 164. Although shown with these particular components in the embodiment of FIG. 1, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 110 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 135. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 135 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 1, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 2:
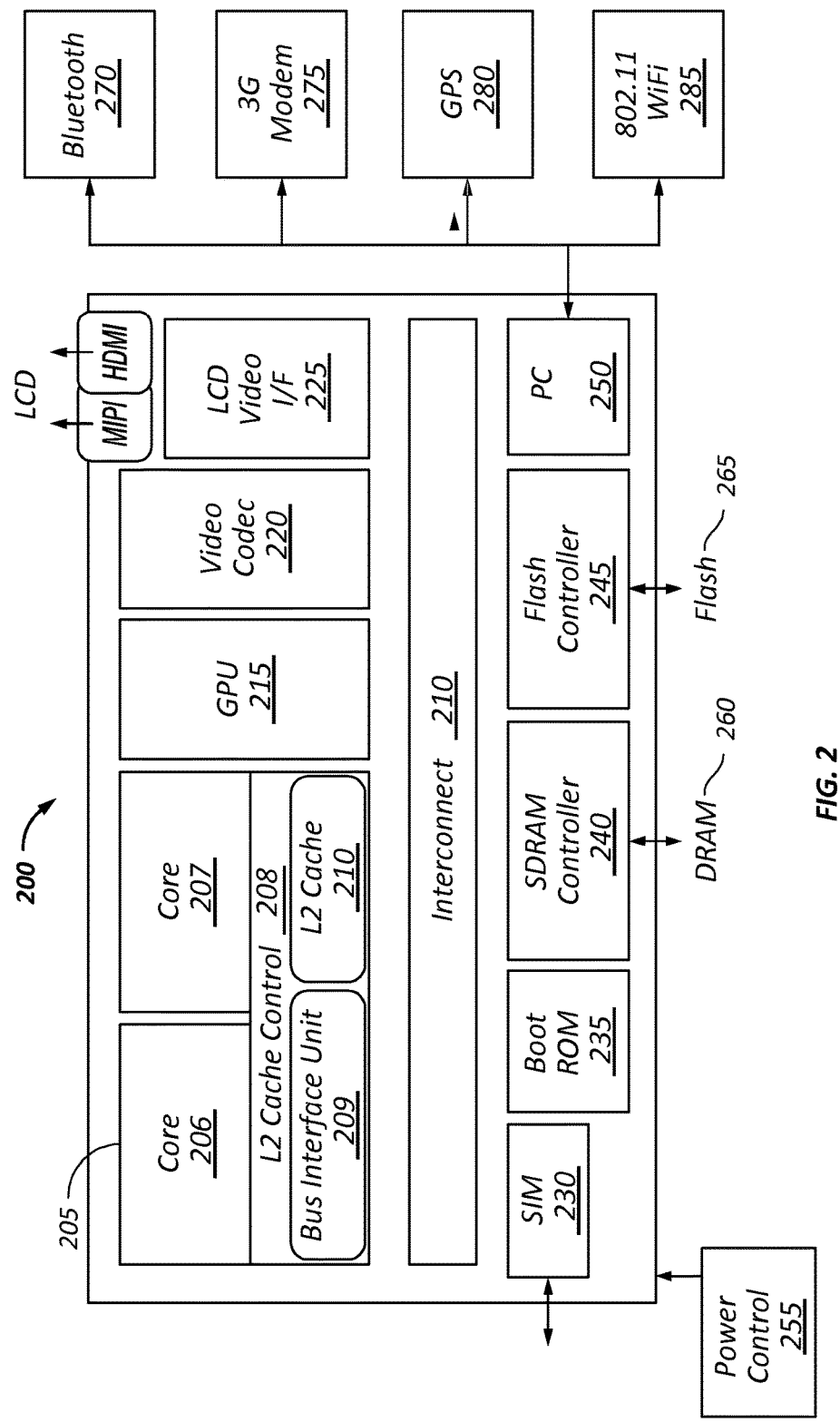
FIG. 2 illustrates another block diagram for an example computing system in accordance with certain embodiments.

Turning next to FIG. 2, another block diagram for an example computing system in accordance with certain embodiments is shown. As a specific illustrative example, SoC 200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 200 includes 2 cores—206 and 207. Similar to the discussion above, cores 206 and 207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 206 and 207 are coupled to cache control 208 that is associated with bus interface unit 209 and L2 cache 210 to communicate with other parts of system 200. Interconnect 210 includes an on-chip interconnect, such as an IOSF, AMBA, or other interconnect discussed above, which potentially implements one or more aspects of the described disclosure.

Interface 210 provides communication channels to the other components, such as a Subscriber Identity Module (SIM) 230 to interface with a SIM card, a boot rom 235 to hold boot code for execution by cores 206 and 207 to initialize and boot SoC 200, a SDRAM controller 240 to interface with external memory (e.g. DRAM 260), a flash controller 245 to interface with non-volatile memory (e.g. Flash 265), a peripheral control Q1650 (e.g. Serial Peripheral Interface) to interface with peripherals, video codecs 220 and Video interface 225 to display and receive input (e.g. touch enabled input), GPU 215 to perform graphics related computations, etc. Any of these interfaces may incorporate aspects of the disclosure described herein.

In addition, the system illustrates peripherals for communication, such as a Bluetooth module 270, 3G modem 275, GPS 285, and WiFi 285. Note as stated above, a UE includes a radio for communication. As a result, these peripheral communication modules are not all required. However, in a UE some form of a radio for external communication is to be included.

Figure 3:
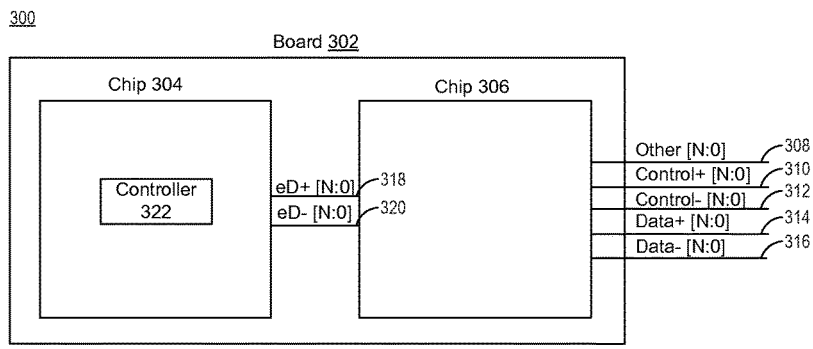
FIG. 3 illustrates a system with a circuit board that includes a first chip that communicates with a plurality of signal lines coupled to the board by utilizing a second chip that functions as a repeater in accordance with certain embodiments.

FIG. 3 illustrates a system 300 including a circuit board 302 that includes a first chip 304 that communicates with a plurality of signal lines 308, 310, 312, 314, and 316 coupled to the board by utilizing a second chip 306 that functions as a repeater. The second chip 306 bridges communications received from a plurality of the signal lines to chip 304 over one or more embedded signal lines 318 and 320. The plurality of signal lines may include multiple different sets of one or more signal lines each where each set carries data independent of the other set(s). For example, in the depicted embodiment, a first set of signal lines comprises signal lines 310 and 312 and a second set of signal lines comprises signal lines 314 and 316. In some embodiments, one or more of the sets may include a single signal line or multiple signal lines wherein only a single signal line is used to transmit information.

As used herein, a signal line may comprise any suitable medium of communication operable to transfer data signals, such as a conductive wire. In various embodiments, a signal line may refer to a medium of communication on a circuit board or on a connector to the circuit board. For example, a signal line may refer to a conductive path associated with the circuit board itself (e.g., a path that runs from circuitry on a circuit board and/or an integrated circuit on the board to a port on the circuit board such as a USB port that receives signals from a connector to device), with a conductive path on a connector coupled to the circuit board (e.g., a USB cable), or a combination of the two (e.g., a conductive path that runs from one device, through a cable, through a port of the circuit board, and to one or more components of the circuit board).

In various embodiments, the signal lines may couple a device (such as those described above with respect to FIGS. 1 and 2 or other suitable computing device) that includes board 302 to one or more external devices. As an example, each group of signal lines may couple to corresponding pins of a connector on board 302 that interfaces directly with a connector of an external device or with a connector of a cable that runs to an external device. The signal lines may couple board 302 to any number (N+1) of external devices. Thus, there may be N+1 different groups of signal lines 308, 310, 312, 314, 316, 318, and 320, with any number of these signal line groups being utilized at a particular time (based on how many devices are coupled to board 302). In some embodiments, chip 306 is operable to simultaneously bridge signals from different groups between the signal lines and chip 304. Herein, a description referring to a particular group of signal lines could be applied to any number (or all) of the groups of signal lines.

In particular embodiments, a first set of one or more signal lines may carry a type of data that is different from a type of data carried by a second set of one or more signal lines. For example, in the embodiment depicted, signal lines 310 and 312 may carry control signals and signal lines 314 and 316 may carry general data signals. Control signals may comprise any suitable type of control information. For example, the control information may include configuration information such as indications of cable (or connector) connectivity or orientation, power management information associated with the transfer of power between devices (e.g., a requested voltage or current), a mode (e.g., a debug accessory mode, audio adapter accessory mode, etc.), configuration information associated with analog audio or low power audio signaling, or any other suitable configuration information. The general data signals sent by lines 314 and 316 may include data and accompanying information such as headers, address information, etc. In various embodiments, control information carried by the first set of signal lines is independent of or not associated with the data carried on the second set of signal lines. For example, in at least one embodiment, successful transmission of the data sent through the second set of signal lines is not dependent on the control information sent over the first set of signal lines. As another example, in at least one embodiment, the data sent through the first set of signal lines does not refer to the data sent through the second set of signal lines.

In various embodiments, communication over the first set of signal lines may conform to a first format or protocol while communication over the second set of signal lines may conform to a second format or protocol. As one example, communication over signal lines 310 and 312 may be performed using the protocol defined for the Configuration Channel (CC) of the USB Power Delivery 2.0 Specification or future USB Power Delivery Specification while communication over signal lines 314 and 316 may be performed using the protocol defined for USB data by the USB 1.x, 2.0, 3.x, or future USB Specification.

Chip 306 is operable to bridge communications between chip 304 and signal lines 310, 312, 314, and 316. Bridging the communications may include any suitable operations allowing information indicated by the signal lines to be passed to the chip 304 and vice versa. For example, chip 306 may receive communications from chip 304 or the signal lines and store or modify the communications (e.g., convert the communications from one protocol to another) before passing the communications on. In other embodiments, the communications may be passed by chip 306 without storing the communications. In particular embodiments, information from one set of signal lines is stored when being bridged by chip 304 while information from another set of signal lines is not stored when being bridged. Thus, information from the first set of signal lines (310 and/or 312) may be stored while information from the second set of signal lines (314 and/or 316) is not stored.

Chip 306 may include any suitable logic for bridging communications between the signal lines and chip 304 or for otherwise facilitating one or more connections between a device including chip 304 and one or more external device. In an embodiment, chip 306 includes a driver and a receiver for each group of embedded signals 318 and 320 (where a group corresponds to an external device). The driver may send the signals from chip 306 to chip 304 while the receiver receives signals from chip 304. The same driver may be configured to send information from either the first signal line set 310 and/or 312 or the second signal line set 314 and/or 316 over embedded signal line 318 and/or embedded signal line 320 based on selection logic of chip 306. Similarly, the same receiver may be configured to receive information for either the first signal line set 310 and/or 312 or the second signal line set 314 and/or 316 over one or more of the embedded signal lines 318 and 320 based on selection logic of chip 306. The driver and receiver may switch between bridging for the first signal line set and the second signal line set based on the outputs of the control logic.

Chip 304 may include any suitable logic for receiving communications from chip 306 and sending communications to chip 306. In various embodiments, chip 304 may also include one or more processors, memory, or other components. In an embodiment, chip 304 is an SoC with any suitable characteristics of the other SoCs described herein. In the embodiment depicted, chip 304 includes controller 322. Controller 322 may be operable to receive communications from or send communications to one or more of the signal line sets and interact with one more other components of chip 304. For example, controller 322 may provide portions of the communications to one or more processors of chip 304 and receive communications for the signal lines from the one or more processors.

Various embodiments of the present disclosure may be used with any signaling protocol that includes separate signal lines for data and control signals (such as USB, HDMI, or other protocol having separate sets of signal lines). However, by way of example, the embodiments described herein focus on implementations directed to communication and power delivery utilizing signals compatible with the USB Type-C protocol. The USB Type-C protocol specifications describe a small form factor connector which can be used for detecting end-to-end attachment/detachment, establishing cable orientation (e.g., flip or twist state), establishing default host/device roles, negotiating power delivery characteristics (a Type-C cable may carry current up to 5 A@ 12V/20V), and providing a guest protocol over configuration channel pins, among other things.

Figure 4:
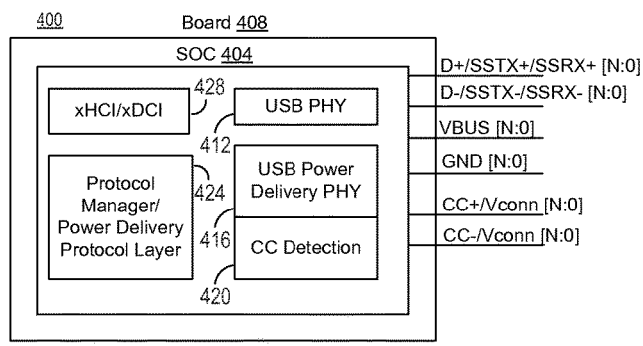
FIG. 4 illustrates an example system for communicating between a system on a chip (SoC) on a circuit board and a USB Type-C connector in accordance with certain embodiments.

FIG. 4 illustrates an example system 400 for communicating between an SoC 404 on a circuit board 408 and a USB Type-C connector in accordance with certain embodiments. In this implementation, SoC 404 includes all of the logic to implement USB communication and USB power delivery (in addition to other logic common to an SoC such as one or more processors, memory, and other components) on a single chip. The signals on the right represent signals that may be received at board 408 from a USB Type-C cable. The configuration channel (CC) signals are used to communicate control data. For example the CC signals may be used to determine a host-to-device relationship and to set up and manage power and alternate/accessory modes. Using the CC signals, a simple 5 volt power delivery and charging solution may be enabled using the VBUS and GND signals. The CC signals may also enable more advanced power delivery and battery charging features (e.g., as defined in the USB Power Delivery Specification). In operation, only one CC pin is connected through the cable to the board 408 to establish signal orientation and the other CC pin is repurposed as Vconn for powering electronics in a USB Type-C plug (e.g., a repeater in an active cable). The signals may also include data busses represented by D+ and D− (used in USB 2.0) and SSTX+, SSRX+, SSTX−, and SSRX− (used in USB 3.1). Board 408 may be capable of receiving N+1 groups of each of these signals (where each group of signals is associated with a different USB device).

The SoC 404 includes a USB PHY layer 412 to interface with the data bus signals and handle low level USB protocol and signaling. For example, the USB PHY layer may provide data serialization and de-serialization, encoding and decoding (e.g., non-return-to-zero-inverted (NRZI) for USB2 or 8b/10b for USB3), buffers, clock domain shifting (e.g., from the USB rate to the clock rate of the SoC 404), and other functions related to communication with the USB data buses. SoC 404 also includes a USB Power Delivery PHY layer 416 to interface with the CC signals. USB Power Delivery PHY layer 416 may provide data serialization and de-serialization, encoding and decoding (e.g., NRZI for USB2 and 8b/10b for USB3), buffers, clock domain shifting (e.g., from the rate of the CC signals to the clock rate of the SoC 404), and other functions related to communication with the CC signal lines. SoC 404 further includes CC Detection logic 420 operable to detect connection of either of the CC signal lines. SoC 404 also includes a protocol manager/power delivery protocol layer 424 to communicate with connected external devices over the CC lines to manage power transferred between SoC 404 and the connected devices.

SoC 404 may also include an eXtensible Host Controller Interface (xHCI)/eXtensible Device Controller Interface (xDCI) 428 which interfaces with one or more processors located on board 408 or otherwise coupled to SoC 404. The xHCI/xDCI 428 may control the transmission of data between the one or more processors and various components of SoC 404 (such as a USB PHY or a USB Power Delivery PHY). The xHCI/xDCI 428 may be compatible with any suitable protocol, such as USB 1.x, 2.0, 3.x, or future USB standard. In some embodiments, the xHCI/xDCI 428 sends interrupts to the one or more processors indicating that there is a USB transaction that needs handling. The xHCI/xDCI 428 may also store a critical state related to bus management (e.g., bandwidth allocation or address assignment).

In such an embodiment, the SoC 404 receives each signal from a USB connector via a pin of the SoC. Such an embodiment may be beneficial if each component that processes these signals operates at a similar voltage. However, as voltages of SoCs continue to drop (e.g., to 1V or below) to conserve power, it becomes difficult to implement all of the circuitry on-die (especially the circuitry related to power delivery). Moreover, in such an embodiment, the pin count of the SoC may be higher than desired, since the SoC must include pins for the data buses and the control buses (e.g., the CC signals).

Figure 5:
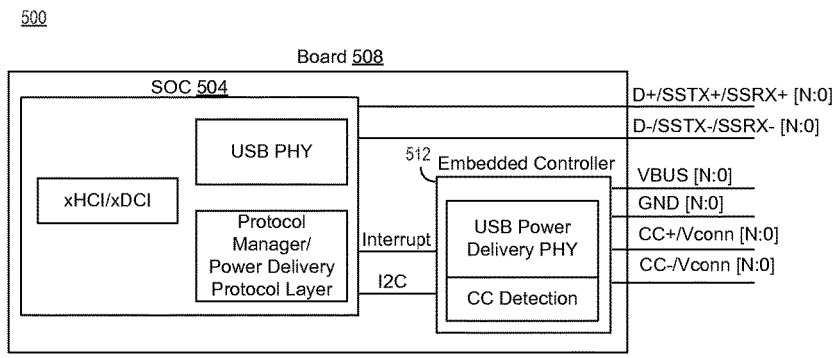
FIG. 5 illustrates an example system for communicating between an SoC on a circuit board and a USB Type-C connector by using an embedded controller in accordance with certain embodiments.

FIG. 5 illustrates another example system 500 for communicating between an SoC 504 on a circuit board 508 and a USB Type-C connector. System 500 includes components that are similar to the components of system 400. However, in system 500, the USB Power Delivery PHY and the CC detection logic are located on a separate chip rather than on the SoC that includes the other components. In the embodiment depicted, the USB Power Delivery PHY and the CC detection logic are located on an embedded controller 512 located on the same board 508 as the SoC 504. Although the SoC pin count is reduced relative to the embodiment that includes system 400, supporting USB power delivery and CC detection on an embedded controller results in increased manufacturing costs. Including the USB Power Delivery PHY layer on a different chip from the SoC is particularly costly.

Figure 6:
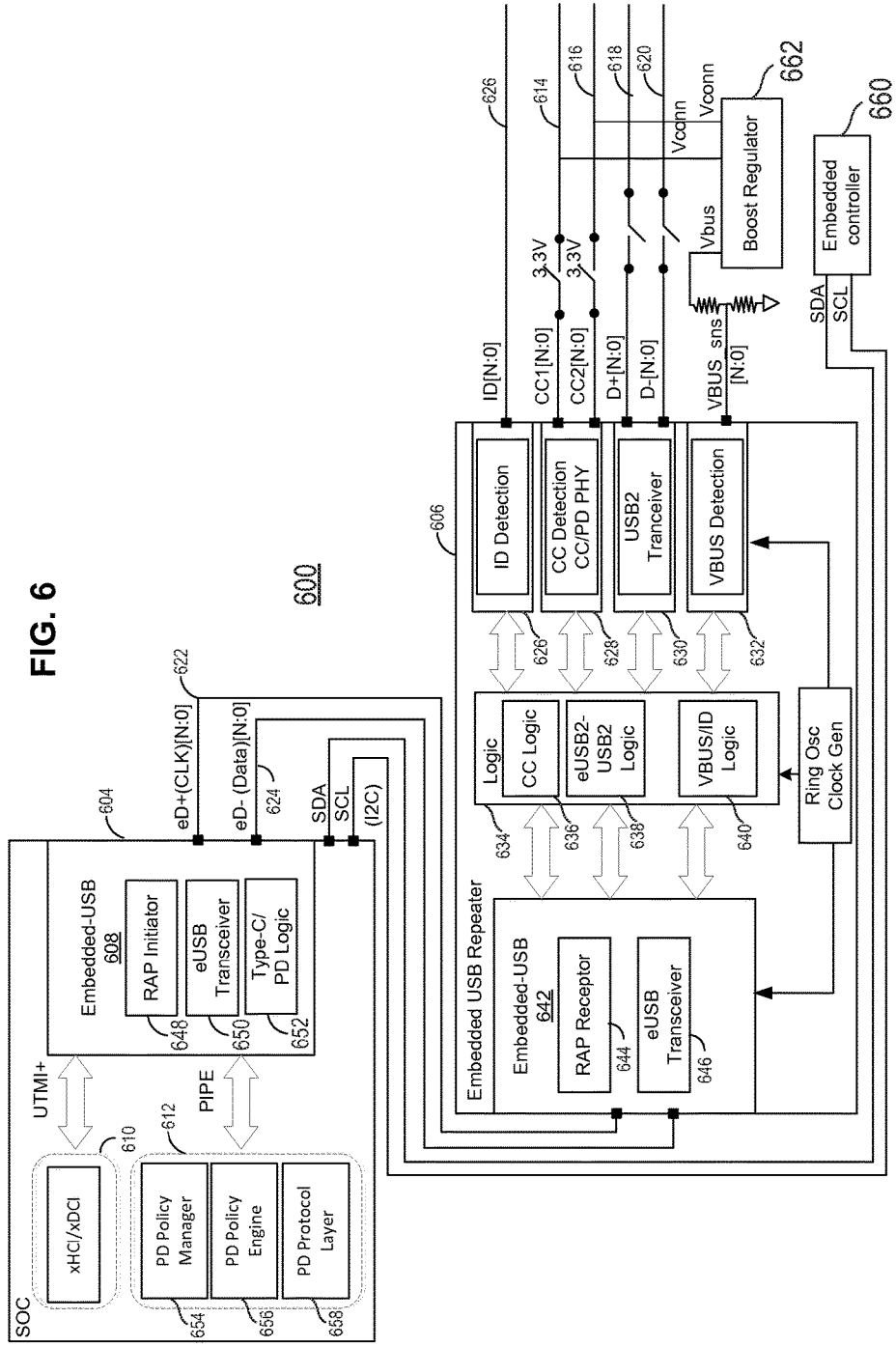
FIG. 6 illustrates an example system with an embedded USB repeater for communicating between an SoC and signal lines from one or more USB Type-C connectors in accordance with certain embodiments.

FIG. 6 illustrates an example system 600 with an embedded USB repeater 606 for communication between an SoC 604 and signal lines from one or more USB Type-C connectors. This embodiment reduces the number of pins at the SoC 604, reduces cost, and is more power efficient relative to other designs. Embedded USB repeater 606 may be on a chip that is different from a chip that includes SoC 604. In various embodiments, these chips may be located on the same circuit board or different circuit boards. In some embodiments, at least some of the logic on repeater 606 may operate at a higher voltage than at least some of the logic on SoC 604. For example, a majority of the logic of repeater 606 may operate at a higher voltage than a majority of the logic on SoC 604 (such as embedded-USB logic 608, xHCI/xDCI 610, power logic 612, one or more processors, memory, or other logic). Such embodiments allow the high voltage logic components needed in USB Type-C signaling to function properly while allowing the SoC to conserve power by operating at a lower voltage. The repeater enables USB Type-C Power Delivery (PD) communication and CC detections without increasing the SoC pin count. FIG. 6 may represent a more specific embodiment of FIG. 3 and may include any suitable characteristics described with respect to FIG. 3.

In this embodiment, repeater 606 acts as a bridge between a USB Type-C connector and SoC 604. Logic on the repeater can select between enabling a CC communication path (where information associated with either of CC line signals 614 or 616 is passed through the eD signal lines 622 and 624) or a USB communication path (where information associated with D+ and D− line signals 618 and 620 is passed through the eD signal lines 622 and 624).

As used herein, a communication path may refer to any suitable communication medium and/or circuitry that enables communication between a source and a destination. As a signal travels through the communication path from a source to a destination, it may be stored, transformed, or have any other suitable operation performed on it before it reaches the destination. A communication path may comprise multiple portions that are temporarily disconnected from each other (e.g., through a multiplexer or other switch circuitry). In the embodiment depicted, an example communication path may exist between a port coupled to signal lines 618 and 620 and xHCI/xDCI controller 610 and another example communication path may exist between a port coupled to one of the signal lines 614 or 616 and power logic 612.

Each group of signal lines 614, 616, 618, and 620 (in the embodiment shown there are N+1 separate groups of signal lines, where N may be any suitable non-negative integer) may be coupled to a USB Type-C receptacle that is operable to be coupled mechanically and electrically to a USB Type-C connector of a USB Type-C cable that couples a device to the repeater 606 (or the receptacle may be coupled directly to a device such as a memory stick that has a USB Type-C connector). A circuit board that houses or is otherwise coupled to repeater 606 and SoC 604 may include a pin for each signal line in a receptacle.

ID signal line 626 may be used to negotiate host/client roles between a device that includes SoC 604 and repeater 606 and a device coupled to that device via the USB cable. CC signal lines 614 and 616 are used in the discovery (e.g., connection detection), configuration, and management of connections across a USB Type-C cable. Based on the plug orientation, one of the CC signal lines 614 or 616 is used for carrying CC signals while (if the USB plug includes active components in the plug) the other CC line is coupled to the Vconn signal to provide power to the USB plug. The CC signal lines may provide configuration data for power features, audio features (as one example the CC information may configure the connection for an audio adapter accessory mode compatible with analog headphones), video features, PCI features, docking station features, or other features associated with the connection between the devices. In one embodiment, a CC signal line may provide configuration data that specifies how power should be delivered from a battery of a device that includes repeater 606 to a battery of an external device or vice versa.

In some embodiments, the Vconn signal may be derived from the Vbus signal (e.g., through boost regulator 662) while in other embodiments, these signals may be independently generated. The Vbus signal may carry power for charging or operating an external device. In one embodiment, the Vbus line may carry a signal having a voltage of up to 20V or a current of up to 3 A. Vconn is used to supply power for active components in a USB cable and may have any suitable voltage (e.g., 5V).

D+ and D− signal lines 618 and 620 are a differential pair that carry USB data (e.g., as defined by the USB 2.0 Specification or other USB specification). In various embodiments, two differential pairs (e.g., a differential transmit pair and a differential receive pair as defined by the USB 3.1 Specification) may be coupled to repeater 606. The plug itself may have two sets of signal lines to enable plug flipping.

Various switches may be coupled to these signal lines to protect the repeater 606. In various embodiments, these switches may be 3.3V compliant.

Repeater 606 includes various detection blocks 626, 628, and 632 and USB2 Transceiver 630 operable to detect connected signal lines, receive signals over those signal lines, and communicate with a corresponding logic block from logic 634. The various blocks may also be operable to receive instructions or other communications from SoC 604 via logic 634 and pass information accordingly through the respective signal lines to the external device.

ID detection block 626 is responsible for ID detection (e.g., detecting a signal received through the ID signal line 626) and communicating the received information to VBUS/ID logic 640. Similarly, VBUS Detection block 632 is responsible for VBUS detection and communicating the received information to VBUS/ID logic 640. VBUS/ID logic 640 may pass this information along to register access protocol (RAP) Receptor 644 of embedded-USB logic 642 to be written to one or more registers and passed to SoC 604.

CC detection block 628 is responsible for CC detection (e.g., detecting a signal received through one of the CC lines 614 and 616) and communicating information received via the CC signal line to CC logic 636. The CC logic 636 may pass this information to RAP Receptor 644 to be written to one or more registers and passed to SoC 604.

USB2 Transceiver 630 is responsible for receiving USB data communicated over D+ and D− signal lines 618 and 620 and passing the received information to eUSB2-USB2 logic 638. USB2 Transceiver 630 may perform any suitable processing of the USB data such as decoding. The eUSB2-USB2 logic 638 converts between USB 2 signaling and eUSB2 signaling (i.e., it converts packets from one protocol to another). The eUSB2 protocol may define communication characteristics for chip-to-chip communication.

Logic 634 is responsible for logic related to USB-Type C communication as defined in the USB Type-C Specification such as logical operations associated with CC detection, VBUS detection, USB PD communication over CC pin, and other functions. Logic 634 may also provide encoding for data communicated through the logic block, such as 4b5b encoding or Biphase Mark Code (BMC encoding). Logic may also provide start-of-packet (SOP) insertion for USB Type-C PD communications.

As mentioned, logic 634 may communicate with the RAP Receptor 644 to write detection information to associated registers. Logic 634 may also receive instruction sets from the SoC from registers read by the RAP Receptor 644. Logic 634 also selects whether the USB communication path or the CC communication path is selected for communication over the embedded data signal lines 622 and 624.

Embedded USB logic 642 includes eUSB transceiver 646. The eUSB transceiver 646 is capable of sending and receiving data transmissions through the eD+ and eD− lines 622 and 624 and may include any suitable transceiver logic, such as one or more serializers, deserializers, receivers, and drivers. When the USB communication path is selected, the eUSB transceiver 646 is operable to receive USB data from the eUSB2-USB2 logic 638, condition the data for transmission to SoC 604, and transmit the data to SoC 604. The eUSB transceiver 646 is also operable to receive USB data from SoC 604 and pass the data on to eUSB2-USB2 logic 638 for eventual transmission through the D+ and D− signal lines 618 and 620 to the external device. When the USB communication path is selected, eD+ 622 and eD− 624 are used as a differential data line. When the CC communication path is selected, the eUSB transceiver 646 may receive read and write requests from SOC 604 and send responsive data to SoC 604. When the CC communication path is selected, eD− 624 may be used as a single-ended line to pass data from the repeater 606 to the SoC 604.

Embedded USB logic 642 further includes RAP receptor 644. RAP receptor 644 receives detection or other configuration information from the CC logic 636, VBUS/ID logic 640, and eUSB2-USB2 logic and writes the information to registers on repeater 606. For example, power information (e.g., current or voltage setpoints), cable orientation, attach, detach, resume, disconnect, and guest protocol related control signals may be written to the registers. When the CC communication path is selected, RAP receptor 644 also receives requests from SoC 604 to read the information (or state of the information) in the registers and responds to these requests by sending the information over one or more of the embedded data signal lines 622 and 624. In a particular embodiment, when an instruction to read a register is sent to the RAP receptor 644, signal line 622 carries a clock signal from the SoC 604 to repeater 606 and signal line 624 carries data representing the instruction. RAP receptor 644 sends the requested data back over signal line 624 (without forwarding a separate clock signal back to SoC 604). In a particular embodiment, the SoC 604 and repeater 606 may transfer data with each other according to the register access protocol. This may allow the SoC 604 to minimize power usage since it may power up its logic to request data at any suitable time rather than maintaining the logic in a powered-on state to receive data as soon as it arrives at the repeater 606.

In normal operation, the CC communication path will be selected first and all of the CC communications will take place between the repeater 606 and the SoC 604 before the USB communication path is selected. After the detection and other configuration information has been received, the RAP receptor 644 goes idle. SoC 604 may periodically communicate (e.g., every 1 ms) with the repeater 606 via the eD+ and eD− signal lines 622 and 624 to determine whether data in the registers of the repeater 606 have changed and to read the data from the registers. The RAP receptor also reads the registers to communicate with the PD PHY block 628 when instructions from the SoC that involve communication over the CC line with the external device are received.

SoC 604 includes embedded-USB logic 608, xHCI/xDCI 610 (which may have any suitable characteristics of the xHCI/xDCIs described above), and power logic 612. The embedded-USB logic 608 is responsible for managing communication over the eD+ and eD− lines 622 and 624 and includes RAP initiator 648, eUSB transceiver 650, and Type-C/PD logic 652.

The RAP initiator 648 is responsible for initiating repeater 606 register reads and writes. When a read or write is performed, RAP initiator 648 instructs eUSB transceiver 650 to drive the corresponding data and clock on eD+ and eD− pins.

The eUSB transceiver 650 is capable of sending and receiving USB data transmissions through the eD+ and eD− lines 622 and 624 and may include any suitable transceiver logic, such as one or more serializers, deserializers, receivers, and drivers. In an embodiment, the eUSB transceiver 650 drives a unidirectional clock through the eD+ line and data is driven bi-directionally through the eD− line. In a particular embodiment, the eUSB transceiver operates at 1 V (with a differential swing of 500 mV).

The eUSB transceiver 650 may interact with the xHCI/xDCI 610 using any suitable protocol. In the embodiment depicted, eUSB transceiver 650 and xHCI/xDCI communicate using the USB Transceiver Macrocell Interface+ (UTMI+) protocol.

Type-C/PD logic 652 is responsible for communication path selection logic. For example, logic 652 may control logic that selects whether the USB communication path or the CC communication path is coupled through signal lines 622 and 624. The Type-C/PD logic 652 controls the communication path selection based on CC detection information obtained from repeater 606. The Type-C/PD logic also controls USB PD communication. The Type-C/PD logic communicates with the RAP initiator 648 to read registers and communicates with a write register on the SoC 604 used by the eUSB transceiver 650 to send communications to the repeater 606.

SoC 604 also includes PD logic 612. The PD logic 612 includes PD Policy Manager 654, PD Policy Engine 656, and PD Protocol Layer 658. PD Policy Manager 654 is responsible for defining power policy between host and device (e.g., what type of charging to enable, whether high power is needed, etc.). PD policy engine 656 implements the policies defined by PD policy manager, and PD protocol layer 658 (which includes a PD PHY) will receive data from the PD policy engine 656 and packetize it according to the PD protocol. The PD protocol layer 658 initiates and controls all communication between the SoC 604 and the repeater 606. Thus, the PD protocol layer 658 initiates and controls all communication from the SoC 604 to the CC pin (through the repeater 604). The PD protocol layer 658 interfaces with the path selection logic of the Type-C/PD logic 652. For example, the PD protocol layer 658 may instruct path selection logic in the Type-C/PD logic 652 to select between the CC communication path and the USB communication path. The Type-C/PD Logic 652 and the PD protocol layer 658 may communicate with each other through any suitable interface, such as an interface similar to the PHY Interface for PCI Express (PIPE).

The PD protocol layer 658 is also responsible for obtaining communications associated with detections from the repeater 606. The PD logic 612 may also communicate through any suitable protocol (such as I2C) with an embedded controller 660 and charger logic to communicate Type-C high current indications (e.g., voltage or current setpoints). As an example, the PD policy manager 654 may initiate I2C communication between the SoC 604 and the embedded controller 660 to effectuate power decisions made by the PD policy manager 654. In the embodiment depicted, the I2C communication is enabled by two bidirectional lines, Serial Data Line (SDA) and Serial Clock Line (SCL).

The embedded controller 660 includes a battery charging integrated circuit. The embedded controller 660 may instruct a boost regulator 662 to enable a 5V Vconn signal over one of the CC signal lines (i.e., the CC signal line that is not being used to communicate with the repeater 606) upon an indication from the SoC 604 of an active cable insertion (which receives this indication through the repeater 606). The embedded controller may also communicate with the boost regulator 662 to enable either a 5V, 12V, or 20V output over the VBUS line (based on information received by the SoC 604 from the CC signal line). In an embodiment, the embedded controller and the boost regulator may be located on or otherwise coupled to the same circuit board as the SoC and the repeater 606.

The SoC 604 and the repeater 606 may each include a state machine that controls various operations of each chip (including which communication path is selected) based on various inputs. On the SoC side, the embedded controller 660 is enabled when the system is powered on. Embedded controller 660 enables all the supplies of the SoC and waits for communication from the SoC. The selection logic of the SoC is instructed to select the CC communication path. The PD policy manager 654, policy engine 656, and protocol layer 658 wait for indication of a connection of a device (e.g., an upstream facing port (UFP) or downstream facing port (DFP) as defined in the USB Type-C specifications) through the CC communication path. Upon the indication of attach and orientation at a particular USB port, the PD protocol layer 658 makes port assignments for that port. The SoC 604 communicates to the embedded controller 660 to start checking VBUS and default charging current. If there is an active cable connected, the SoC 604 communicates to embedded controller 660 and provides instructions to enable Vconn on the CC1 or CC2 pin (i.e., Vconn will be carried on the CC pin that is not attached to carry CC data). Side band communication may be performed through RAP or other suitable method with repeater 606 for all communications related to power delivery. For example, upon receiving an indication of a high current requirement, the SoC sends a communication to the embedded controller 660 to increase charging current, voltage, or power. Upon receiving an indication to transfer to USB signaling, the selection logic enables the USB communication path.

On the repeater side, when the system is powered on, the embedded controller enables all of the power supplies of the repeater 606. The repeater state machine waits for a device (e.g., UFP or DFP) to attach. The selection logic of the repeater 606 enables the CC communication path to communicate CC detections or other communication to the SoC 604. In response to an indication of an attachment of an external device, the repeater 606 communicates to the SoC 604 through the CC communication path. Upon getting an indication of the orientation of the CC pin, active cable connection or accessory, or medium or high current indication, the repeater communicates this information to the SoC through the CC communication path using RAP or other suitable method. Upon receiving a side band communication from the SoC (e.g., Power Delivery communication data as defined below), repeater 606 inserts SOP and adds 4b5b encoding, performs BMC encoding, and transmits the communication over the CC pin to the external device. Upon receiving an indication to transfer to USB signaling, the selection logic enables the USB communication path and begins transferring USB signaling over the eD+ and eD− pins.

Figure 7:
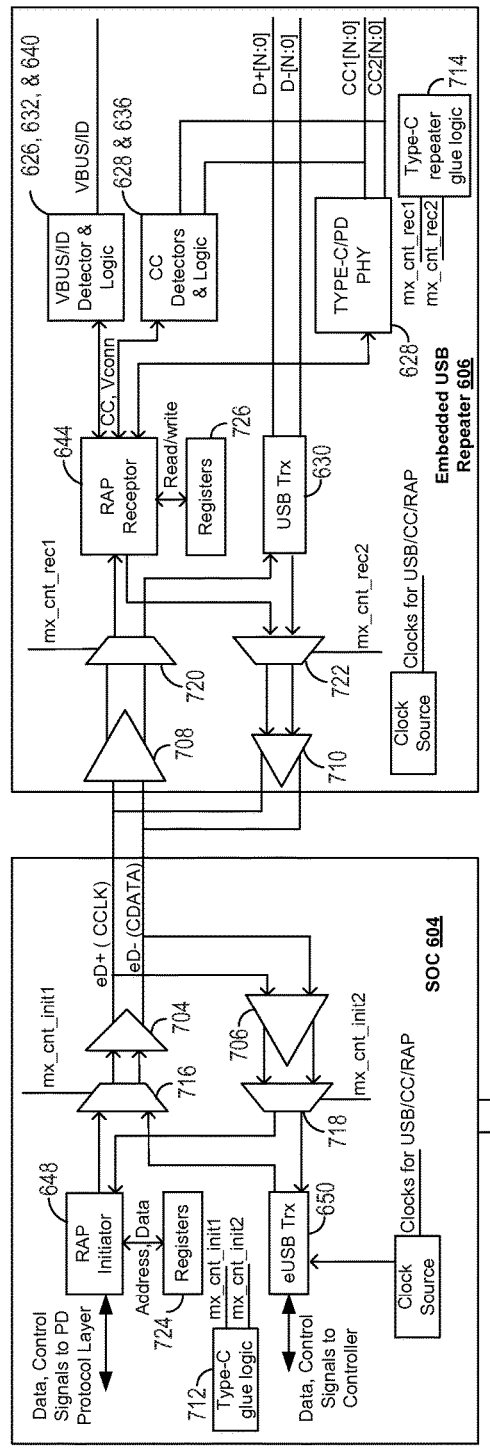
FIG. 7 illustrates communication path selection logic of the repeater and SoC of FIG. 6 in accordance with certain embodiments.

FIG. 7 illustrates communication path selection logic of the repeater 606 and SoC 604. A driver 704 and receiver 706 in the SoC 604 are both shared by the USB communication path (which is coupled to a controller on the SoC such as xHCI/xDCI 610) and the CC communication path (which is coupled to RAP initiator 648). At the repeater 606, a driver 708 and a receiver 710 are also shared by the USB communication path (which is coupled to the D+ and D− signal lines) and the CC communication path (which is coupled to one of the CC signal lines based on the orientation of the cable).

In the embodiment depicted, the communication path selection logic comprises Type-C glue logic 712, Type-C repeater glue logic 714, multiplexing logic 716 and 722, and demultiplexing logic 718 and 720. Type-C glue logic 712 outputs a control signal mx_cnt_init1 for selecting between the USB communication path and the CC communication path at multiplexing logic 716 and a control signal mx_cnt_init2 for selecting between the USB communication path and the CC communication path at demultiplexing logic 718. Type-C repeater glue logic 714 outputs a control signal mx_cnt_rec1 for selecting between the USB communication path and the CC communication path at multiplexing logic 722 and a control signal mx_cnt_rec2 for selecting between the USB communication path and the CC communication path at demultiplexing logic 720. Type-C glue logic 712 and Type-C repeater glue logic 714 outputs the control signals based on detections that occur at the repeater 606. At the SoC 604, the Type-C glue logic 712 may receive instructions from the PD protocol layer 658 and base its output on these instructions. In some embodiments, the selections may be based on whether a type C connector or a regular USB connector (i.e., one without CC signal lines) is coupled to the repeater 606. For example, if a regular USB connector is coupled to the repeater 606, the selection logic may be defaulted to the USB communication path while the regular USB connector is coupled.

In the embodiment depicted, SoC 604 includes registers 724 coupled to the RAP initiator 648 and repeater 606 includes registers 726 coupled to RAP receptor 644. The registers may be used to hold detection and other configuration data received from the VBUS, ID, and CC signal lines. In the embodiment depicted, the configuration data is received by RAP receptor 644 and stored in registers 726. When the state of a register changes (either in response to the change or in response to a message received from the SoC), RAP receptor 644 sends a notification through multiplexing logic 722 and driver 710 to the SoC 604. The notification is received by receiver 706 and passed through demultiplexing logic 718 to the RAP initiator 648. The notification is then passed on to the PD logic 612. Commands from the PD logic 612 may be sent to the RAP initiator 648 and stored in registers 724. The commands may be sent through multiplexing logic 716, driver 704, receiver 708, and demultiplexing logic 720 to RAP receptor 644. The commands may then be sent through the CC logic 636 and CC detection & CC/PD PHY 628 to the CC signal line coupled to block 628. In various embodiments, registers associated with the CC communication path may be located at only one of SoC 604 or repeater 606. In some implementations, only the repeater or only the SoC includes registers to store data sent over the CC signal line.

Figure 8:
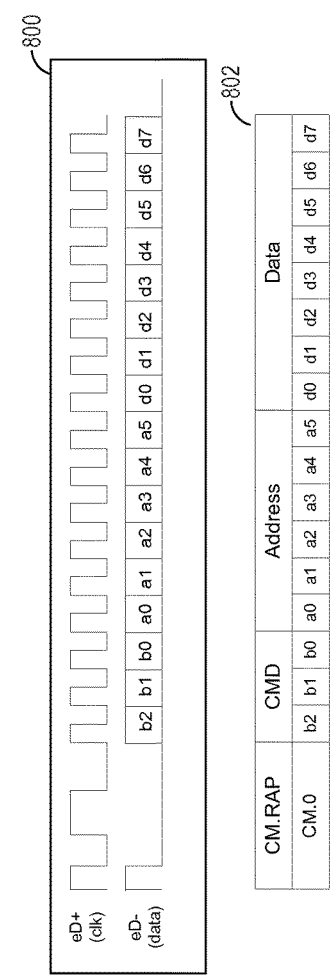
FIG. 8 illustrates an example signaling protocol used to communicate instructions between two chips in accordance with certain embodiments.

FIG. 8 illustrates an example signaling protocol used to communicate instructions between two chips (e.g., repeater 606 and SoC 604). The timing waveform 800 shows that both eD+ and eD− are pulsed high and then eD+ is pulsed high again before the transmission of the command begins. eD+ is then periodically pulsed for each bit of data transmitted by eD−. As depicted in diagram 802, the first three bits represent a command, the next six bits represent a memory address (e.g., an address of a register), and the last eight bits represent data. Of course, any suitable protocol with any suitable number of bits in each field may be used to communicate commands in other embodiments. In one embodiment, if command (CMD) bit2 is 0, then d0 through d7 will have control data information (related to the detection of CC) and if CMD bit 2 is set to 1, then d0 through d7 will have PD communication information.

Decoding logic within the RAP receptor 644 may decode the command from the SoC 604 and the requested action may then be performed. Various embodiments, may include any suitable commands and encodings of those commands. One example is given in the table below:

| CMD | Operation | Description |
|-----|-----------|-------------|
| 000 | Write | Control data written to the register address |
| 001 | Read | Control data read from the register address |
| 010 | Clear | Active high bit-wise clear with the data on the register address |
| 011 | Set | Bit-wise OR with the data on the register address |
| 100 | Write | Power Delivery communication data is written to the register address |

-continued

| CMD | Operation | Description |
|---|---|---|
| 101 | Read | Power Delivery communication data is read from the register address |
| 110 | Clear | Active high bit-wise clear with the data on the register address |
| 111 | Set | Bit-wise OR with the data on the register address |

In the embodiment described above, the data width is eight bits but in other embodiments the data width may be any suitable width, such as sixteen bits. In the above, the Power Delivery communication data may correspond to the Power Delivery communication data defined in the USB Power Delivery 2.0 Protocol or future USB Power Delivery Protocol. Examples of the control data and indications associated with each set of control data is given in the table below (though in other embodiments any suitable indications may correspond with the control data). In the embodiment described, these descriptions are applicable to data sent when the CMD bit 2 is 0 (indicating that d0 through d7 contains control data information) as described above.

| Data (d0:d7) | Description |
|---|---|
| 0 | Detach UPF/DFP |
| 1 | Attach UPF/DFP |
| 2:5 | Orientation Up/Dn & twisted |
| 6 | Default current detection |
| 7 | Medium current detection |
| 8 | High current detection |
| 9 | Configure CC detection current mode or PD |
| 10 | Configure VConn |
| 11 | Debug accessory mode |
| 12 | Audio adaptor accessory mode |
| 13:16 | Mux section for PD side communication |
| 17:127 | Reserved for indications related to side communication between SOC & repeater |

Figure 9:
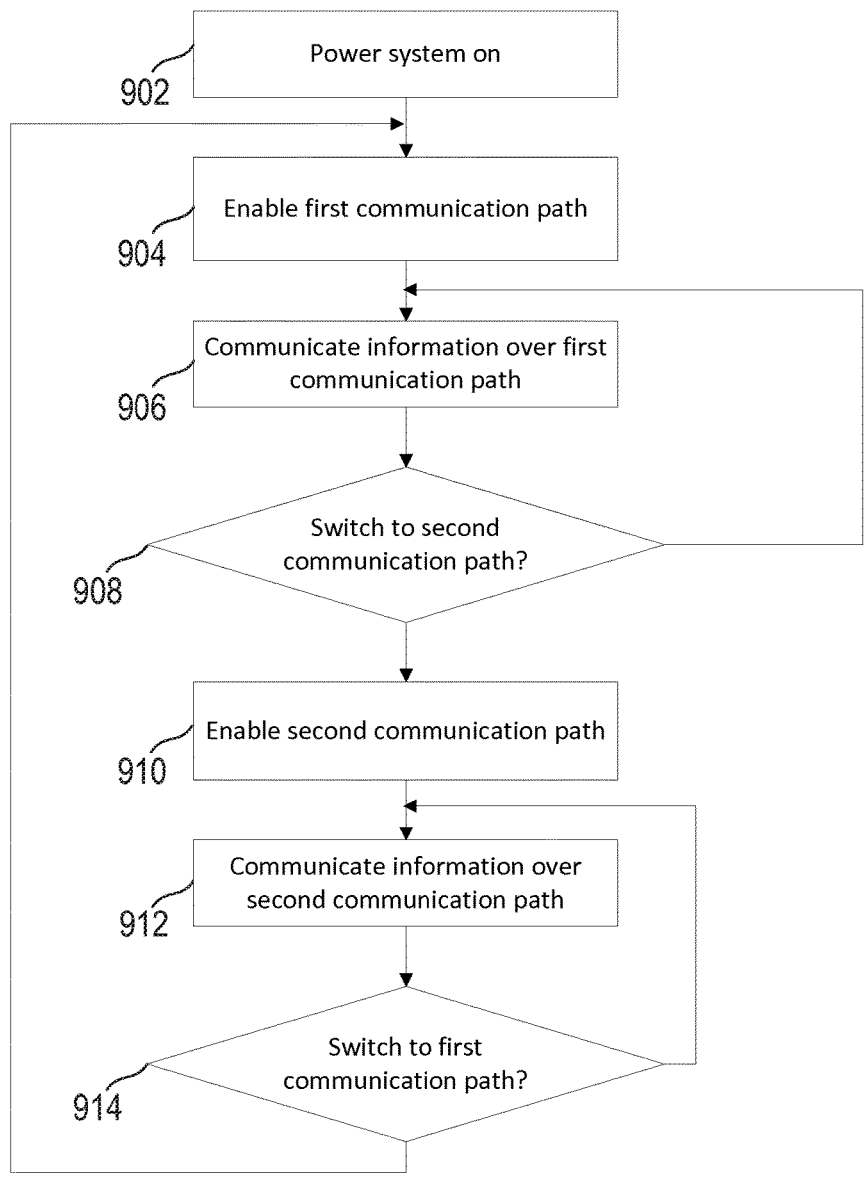
FIG. 9 illustrates a method for selectively enabling first and second communication paths using a repeater in accordance with certain embodiments.

FIG. 9 illustrates a method 900 for selectively enabling first and second communication paths using a repeater. At step 902, a system including the repeater is powered on. In some embodiments, this includes providing power to one or more components of a first chip (e.g., SoC 604) and providing power to one or more components of a second chip (e.g., repeater 606). At step 904, a first communication path (e.g., the CC communication path) is enabled at the first chip (e.g., SoC 604) and the second chip (e.g., repeater 606). The respective communication paths may be enabled by selection logic at each chip. Enabling a communication path may involve configuring one or more multiplexers or demultiplexers at each chip to pass data associated with the selected communication path.

At step 906, information is communicated through the first communication path (e.g., the CC communication path). In one embodiment, configuration information such as the attachment or detachment of a signal line, whether an attached cable is an active cable, an orientation of a cable, requested charging characteristics (e.g., a requested current or voltage), or other configuration information is communicated through the first communication path. In other embodiments, sideband data or any other suitable information may be communicated through the first communication path. In one embodiment, the second chip receives this information, stores the information, and then passes the information on to the first chip in response to a request from the first chip (e.g., a register access command). In another embodiment, the second chip receives this information and passes the information to the first chip without storing the information.

At step 908, it is determined whether the second communication path should be enabled. This may be determined in any suitable manner. For example, state machines on the first and second chips may determine the communication path should be switched based on information received through the first communication path (e.g., the information may indicate that configuration is complete or that USB data is ready to be transferred) or through other suitable indications. At step 910, a second communication path (e.g., the USB communication path) is enabled at the first chip (e.g., SoC 604) and the second chip (e.g., repeater 606). At the same time, the first communication path is disabled. At step 912, information is communicated over the second communication path. Any suitable information may be communicated over the second communication path. For example, USB data may be communicated over a differential pair from an external device, through repeater 606, to a controller of SoC 604.

At step 914, it is determined whether the first communication path should be enabled again. This may be determined in any suitable manner. For example, state machines on the first and second chips may determine the communication path should be switched based on any suitable indications, such as an indication that the transmission of data through the second communication path is complete or an indication that data is ready to be sent through the first communication path. Upon a determination that the communication path should be switched, the method returns to step 904, where the first communication path is enabled. Information may again be communicated over the first communication path at 906. In this manner, data may be selectively passed through the first communication path or the second communication path.

Some of the steps illustrated in FIG. 9 may be repeated, combined, modified or deleted where appropriate, and additional steps may also be added to the flowchart. Additionally, steps may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic, a method, and a non-transitory machine readable medium (including information to represent structures, when manufactured, to be configured) to comprise a first port to be coupled to a plurality of signal lines, a signal line of the plurality of signal lines to communicate data signals to be transferred between a first device and a second device; a first portion of a first communication path to be coupled to a first set of one or more of the plurality of signal lines, the first communication path to communicate configuration data to specify one or more attributes of a connection to be established between the first device and the second device; a first portion of a second communication path to be coupled to a second set of one or more of the plurality of signal lines, the second communication path to communicate data to be transferred between the first device and the second device; and a second port to selectively couple the first portion of the first communication path or the first portion of the second communication path to an integrated circuit comprising a processor.

In at least one example, the apparatus is to operate using a first supply voltage that is higher than a second supply voltage to be used to operate the integrated circuit.

In at least one example, the first port is to couple to a Universal Serial Bus (USB) Type-C connector.

In at least one example, the first set of one or more signal lines is to comprise a signal line to be coupled to a configuration channel (CC) of a USB Type-C connector.

In at least one example, the apparatus is to further comprise first path selection logic to select one of the first portion of the first communication path or the first portion of the second communication path to couple to the second port.

In at least one example, the first path selection logic is to select the first portion of the second path for the duration of a connection of a USB connector in response to a determination that the USB connector is not a Type-C USB connector.

In at least one example, the first portion of the first communication path includes one or more storage elements to store the configuration data.

In at least one example, the apparatus is to send the stored configuration data to the integrated circuit in response to a request from the integrated circuit.

In at least one example, a circuit board is to comprise the apparatus and the integrated circuit.

In at least one example, the configuration information is to comprise one or more settings for power delivery between the first device and the second device.

In at least one example, the first set is to comprise one signal line, the second set is to comprise two signal lines, and the at least one additional signal line to couple the second port to the third port is to comprise two signal lines.

In at least one example, the configuration data is independent of the data to be transferred between the first device and the second device.

One or more embodiments may provide an apparatus, a system, a machine readable storage, a machine readable medium, hardware- and/or software-based logic, a method, and a non-transitory machine readable medium (including information to represent structures, when manufactured, to be configured) to comprise a first integrated circuit and a second integrated circuit. The first integrated circuit comprises a first port to be coupled to a plurality of signal lines, a signal line of the plurality of signal lines to communicate data signals to be transferred between a first device and a second device, the second device to comprise the system; a first portion of a first communication path to be coupled to a first set of one or more of the plurality of signal lines, the first communication path to communicate configuration data to specify one or more attributes of a connection to be established between the first device and the second device; a first portion of a second communication path to be coupled to a second set of one or more of the plurality of signal lines, the second communication path to communicate data to be transferred between the first device and the second device; and a second port to be selectively coupled to the first communication path or the second communication path. The second integrated circuit comprises a second portion of the first communication path; a second portion of the second communication path; and a third port to be selectively coupled to the first communication path or the second communication path; and at least one additional signal line to couple the second port to the third port.

In at least one example, the first port is to couple to a USB Type-C cable.

In at least one example, the configuration information is to comprise one or more settings for power delivery between the first device and the second device.

In at least one example, the third port of the second integrated circuit comprises a number of signal pins that is less than the sum of the number of signal lines in the first set and the number of signal lines in the second set.

In at least one example, the second port and the third port are to be coupled to the first communication path before the cable is plugged in to the second device.

In at least one example, the first integrated circuit is to further comprise first path selection logic to select one of the first communication path or the second communication path to couple to the second port; and the second integrated circuit is to further comprise second path selection logic to select one of the first communication path or the second communication path for coupling to the second port.

One or more embodiments may provide an apparatus, a system, a machine readable storage, a machine readable medium, hardware- and/or software-based logic, a method, and a non-transitory machine readable medium (including information to represent structures, when manufactured, to be configured) to couple a port of a first integrated circuit to a first communication path; communicate configuration information between a connector coupled to a second device and a second integrated circuit through the port and the first communication path; decouple the port from the first communication path; couple the port to a second communication path; and communicate data between the connector and the second integrated circuit through the port and the second communication path.

In at least one example, the method is to further comprise detecting an orientation of the connector based on at least a portion of the configuration information.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a first port to couple to a plurality of signal lines, a signal line of the plurality of signal lines to communicate data signals transferred between a first device and a second device;
    a first portion of a first communication path to couple to a first set of one or more of the plurality of signal lines, the first communication path to communicate configuration data to specify one or more attributes of a connection established between the first device and the second device;
    a first portion of a second communication path to couple to a second set of one or more of the plurality of signal lines, the second communication path to communicate data transferred between the first device and the second device;
    a second port to selectively couple the first portion of the first communication path or the first portion of the second communication path to an integrated circuit comprising a processor; and
    first path selection logic to select the first portion of the first communication path to couple to the second port to communicate the configuration data, wherein the configuration data comprises power management information associated with the transfer of power between the first device and the second device, wherein the first path selection logic is to subsequently decouple the first portion of the first communication path from the second port and to couple the first portion of the second communication path to the second port to communicate the data transferred between the first device and the second device.

2. The apparatus of claim 1, wherein the apparatus is to operate using a first supply voltage that is higher than a second supply voltage to be used to operate the integrated circuit.

3. The apparatus of claim 1, wherein the first port is to couple to a Universal Serial Bus (USB) Type-C connector.

4. The apparatus of claim 1, wherein the first set of one or more signal lines comprises a signal line to couple to a configuration channel (CC) of a USB Type-C connector.

5. The apparatus of claim 1, wherein the apparatus further comprises first path selection logic to select one of the first portion of the first communication path or the first portion of the second communication path to couple to the second port.

6. The apparatus of claim 5, wherein the first path selection logic is to select the first portion of the second communication path for a duration of a connection of a USB connector in response to a determination that the USB connector is not a Type-C USB connector.

7. The apparatus of claim 1, wherein the first portion of the first communication path includes one or more storage elements to store the configuration data.

8. The apparatus of claim 7, wherein the apparatus is to send the stored configuration data to the integrated circuit in response to a request from the integrated circuit.

9. The apparatus of claim 1, wherein a circuit board comprises the apparatus and the integrated circuit.

10. The apparatus of claim 1, wherein the configuration data comprises one or more settings for power delivery between the first device and the second device.

11. The apparatus of claim 1, wherein the first set comprises one signal line, the second set comprises two signal lines, and the apparatus comprises at least one additional signal line to couple the second port to a third port that comprises two signal lines.

12. The apparatus of claim 1, wherein the configuration data is independent of the data transferred between the first device and the second device.

13. A system comprising:
    a first integrated circuit comprising:
        a first port to couple to a plurality of signal lines, a signal line of the plurality of signal lines to communicate data signals transferred between a first device and a second device, the second device comprising the system;
        a first portion of a first communication path to couple to a first set of one or more of the plurality of signal lines, the first communication path to communicate configuration data to specify one or more attributes of a connection established between the first device and the second device;
        a first portion of a second communication path to couple to a second set of one or more of the plurality of signal lines, the second communication path to communicate data transferred between the first device and the second device;
        a second port to selectively couple to the first communication path or the second communication path; and
        first path selection logic to select the first portion of the first communication path to couple to the second port to communicate the configuration data, wherein the configuration data comprises power management information associated with the transfer of power between the first device and the second device, wherein the first path selection logic is to subsequently decouple the first portion of the first communication path from the second port and to couple the first portion of the second communication path to the second port to communicate the data transferred between the first device and the second device;
    a second integrated circuit comprising:
        a second portion of the first communication path;
        a second portion of the second communication path; and
        a third port to selectively couple to the first communication path or the second communication path; and
    at least one additional signal line to couple the second port to the third port.

14. The system of claim 13, wherein the first port is to couple to a USB Type-C cable.

15. The system of claim 13, wherein the configuration data comprises one or more settings for power delivery between the first device and the second device.

16. The system of claim 13, wherein the third port of the second integrated circuit comprises a number of signal pins that is less than a sum of the number of signal lines in the first set and the number of signal lines in the second set.

17. The system of claim 13, wherein the second port and the third port are to couple to the first communication path before a cable is plugged in to the second device.

18. The system of claim 13, wherein:
the first integrated circuit further comprises first path selection logic to select one of the first communication path or the second communication path to couple to the second port; and
the second integrated circuit further comprises second path selection logic to select one of the first communication path or the second communication path for coupling to the second port.

19. A method comprising:
coupling a port of a first integrated circuit of a first device to a first communication path;
communicating configuration information between a connector coupled to a second device and a second integrated circuit through the port and the first communication path, wherein the configuration data comprises power management information associated with the transfer of power between the first device and the second device;
decoupling the port from the first communication path;
coupling the port to a second communication path; and
communicating data between the connector and the second integrated circuit through the port and the second communication path, wherein the data is transferred between the first device and the second device.

20. The method of claim 19, further comprising detecting an orientation of the connector based on at least a portion of the configuration information.

* * * * *